Patented Nov. 28, 1944

2,363,549

UNITED STATES PATENT OFFICE 2,363,549

THERAPEUTIC AGENT FOR THE TREATMENT OF HYPERTENSION

Harold M. Rabinowitz, Brooklyn, N. Y.

No Drawing. Application April 6, 1942,
Serial No. 437,843

4 Claims. (Cl. 167—74)

This invention relates to a therapeutic agent for the treatment of hypertension and for the alleviation of the symptoms of either essential hypertension or hypertension of pregnancy complicated by ecclampsia and the method of producing such a therapeutic agent. It has for its objects:

First, to provide a new and improved therapeutic agent of the class described.

Second, to provide such an agent which may be injected intramuscularly.

Third, to provide such an agent which may be easily and inexpensively obtained from raw material which is easily obtainable through a simple process involving easily obtainable substances.

Fourth, to provide such an agent which may be extracted quantitatively from the urine of geldings.

Fifth, to provide a method of producing such an agent which may be carried out easily and inexpensively employing easily obtainable substances.

Other objects and advantages pertaining to details and economies will appear from the description to follow. The invention is defined in the claims.

The therapeutic agent of this invention is a substance which occurs in urine and in particularly high quantities in the urine of geldings. In order to obtain this material in sufficient purity for therapeutic use, I subject the urine to a simple extraction process. The following is an example thereof.

A quantity of urine, preferably from a gelding, is mixed with twice its volume of butyl ether. The mixture is agitated for about six hours at 5000 R. P. M. After the mixing, the mixture is allowed to stand until it separates into two layers, the upper layer consisting of the butyl ether and the material dissolved therein and the lower layer consisting of the aqueous fraction which is a dark brown to black fluid.

The aqueous fraction is separated and the water is evaporated therefrom to leave a black tarry mass. I have found that the water may be evaporated at atmospheric pressure at about 170° F.

The residue of this aqueous fraction is then taken up with sufficient distilled water to form a homogeneous fluid. It is acidified to a pH of 6.5 with dilute acetic acid. Other acids, such as hydrochloric, may be used, although the acetic acid gives the most desirable results. I prefer to have the fluid at a pH of 6.5, although I have found that other acidities will give results.

The acidified solution is permitted to stand for about 12 hours at room temperature, although this time may be varied. The mixture is then extracted with ethyl ether. This is accomplished by adding two parts of ethyl ether to one of the solution and agitating. Thereafter the ether fraction is separated.

The residue may be further extracted with ether until the extracting ether fails to remove any color therefrom.

The ether fraction is then concentrated to dryness, giving a dark brown powdery substance.

The dark brown powdery substance is then sublimed. I have found that this may be accomplished on a hot plate whose temperature is approximately 50–65° C. and that at room temperature the sublimed material will condense.

The sublimed material is crystalline in form and it is collected and re-dissolved in ether. The solution is filtered and the ether distilled off. The resulting dried filtrate is then dissolved in hot distilled water. I prefer water at 80° C. This water solution is filtered and the filtrate is allowed to cool with resulting recrystallization. The crystals may be recovered by filtering off the liquid.

The final product is a white crystalline material which appears in the form of shafts and which has a melting point of 118.6 to 119° C., the exact melting point depending upon the thoroughness of the purification, but purification to a melting point higher than 119° C. being unnecessary for most purposes. It is optically active. It is soluble in hot water but not highly soluble in cold water. It is soluble in 95% ethyl alcohol solution in water and is soluble in chloroform.

In carrying out the process, the final recrystallization may result in the purified product with the above mentioned melting point the first time the material is crystallized from the water solution. If the final product, however, does not have this melting point, it should be recrystallized from water until the final product with the above mentioned melting point is obtained.

I have found that in carrying out the method, the black mass obtained by drying the water fraction of the butyl ether extraction may be extracted with 95% alcohol and the alcohol extract then evaporated. Its residue may then be taken up with distilled water as in the process above described and its pH adjusted with acid as described above and the process carried out in the same manner.

The resulting product may be dissolved in sweet almond oil for intramuscular injection. About 25 mg. per cc. will dissolve in the sweet almond oil.

The dose is from 75 to 125 mg. twice weekly, although in some cases it is given every other day. It is injected intramuscularly.

The therapeutic agent is particularly effective in the treatment of hypertension. It is antipressor in nature in hypertension. It alleviates the characteristic symptoms of hypertension such as severe headaches, dizziness, weakness, sleeplessness and palpitations. This is accompanied by a lowering of both the systolic and diastolic blood pressure, which parallels the amelioration of the symptoms. Relief ordinarily follows by the fourth injection.

In cases of hydertension of pregnancy complicated by ecclampsia, the use of the therapeutic agent has resulted in lowering the patient's serum uric acid.

The terms and expressions which have been herein employed are used as terms of description and not of limitation, and there is no intention, in the use of such terms and expressions, of excluding any equivalents of the features shown and described, or portions thereof. It is recognized that various modifications are possible within the scope of the invention claimed.

Having thus described my invention, what I claim as new and desire to secure by Letters Patent is:

1. The method of making an anti-pressor material which comprises removing the fats from urine, forming a concentrated substantially neutral aqueous acidified solution of the material remaining after removal of the fat, separating from the said concentrated solution the ethyl ether soluble material, reducing the ethyl ether soluble material to solid form, and subliming the solid material so obtained to give a material of melting point above 119° C. and of pronounced anti-pressor properties.

2. The method of making an anti-pressor material which comprises extracting urine with butyl ether, separating and discarding the resulting butyl ether extract, evaporating the remaining aqueous material substantially to dryness, redissolving the residue so obtained with a minimum of water to give a concentrated fluid mass, adding dilute aqueous acid to the said mass to establish the pH at about 6.5, then extracting the mass with ether, separating the ether extract, and evaporating the ether therefrom, to leave a solid product constituting the anti-pressor material.

3. An anti-pressor material comprising the ether soluble extract of fat free urine, the said material having a melting point of about 119° C. and being made as described in claim 1.

4. An anti-pressor composition adapted to intramuscular injection comprising a solution in an oil of the ethyl ether extractable material from fat free urine, the said material having a melting point of about 119° C. and being made as described in claim 1.

HAROLD M. RABINOWITZ.

---

CERTIFICATE OF CORRECTION.

Patent No. 2,363,549.                                    November 28, 1944.

HAROLD M. RABINOWITZ.

It is hereby certified that error appears in the printed specification of the above numbered patent requiring correction as follows: Page 2, second column, line 7, claim 1, for the word "above" read --about--; and that the said Letters Patent should be read with this correction therein that the same may conform to the record of the case in the Patent Office.

Signed and sealed this 10th day of April, A. D. 1945.

Leslie Frazer (Seal)                                   Acting Commissioner of Patents.

25 mg. per cc. will dissolve in the sweet almond oil.

The dose is from 75 to 125 mg. twice weekly, although in some cases it is given every other day. It is injected intramuscularly.

The therapeutic agent is particularly effective in the treatment of hypertension. It is antipressor in nature in hypertension. It alleviates the characteristic symptoms of hypertension such as severe headaches, dizziness, weakness, sleeplessness and palpitations. This is accompanied by a lowering of both the systolic and diastolic blood pressure, which parallels the amelioration of the symptoms. Relief ordinarily follows by the fourth injection.

In cases of hydertension of pregnancy complicated by ecclampsia, the use of the therapeutic agent has resulted in lowering the patient's serum uric acid.

The terms and expressions which have been herein employed are used as terms of description and not of limitation, and there is no intention, in the use of such terms and expressions, of excluding any equivalents of the features shown and described, or portions thereof. It is recognized that various modifications are possible within the scope of the invention claimed.

Having thus described my invention, what I claim as new and desire to secure by Letters Patent is:

1. The method of making an anti-pressor material which comprises removing the fats from urine, forming a concentrated substantially neutral aqueous acidified solution of the material remaining after removal of the fat, separating from the said concentrated solution the ethyl ether soluble material, reducing the ethyl ether soluble material to solid form, and subliming the solid material so obtained to give a material of melting point above 119° C. and of pronounced anti-pressor properties.

2. The method of making an anti-pressor material which comprises extracting urine with butyl ether, separating and discarding the resulting butyl ether extract, evaporating the remaining aqueous material substantially to dryness, redissolving the residue so obtained with a minimum of water to give a concentrated fluid mass, adding dilute aqueous acid to the said mass to establish the pH at about 6.5, then extracting the mass with ether, separating the ether extract, and evaporating the ether therefrom, to leave a solid product constituting the anti-pressor material.

3. An anti-pressor material comprising the ether soluble extract of fat free urine, the said material having a melting point of about 119° C. and being made as described in claim 1.

4. An anti-pressor composition adapted to intramuscular injection comprising a solution in an oil of the ethyl ether extractable material from fat free urine, the said material having a melting point of about 119° C. and being made as described in claim 1.

HAROLD M. RABINOWITZ.

CERTIFICATE OF CORRECTION.

Patent No. 2,363,549.                                November 28, 1944.

HAROLD M. RABINOWITZ.

It is hereby certified that error appears in the printed specification of the above numbered patent requiring correction as follows: Page 2, second column, line 7, claim 1, for the word "above" read --about--; and that the said Letters Patent should be read with this correction therein that the same may conform to the record of the case in the Patent Office.

Signed and sealed this 10th day of April, A. D. 1945.

Leslie Frazer (Seal)                              Acting Commissioner of Patents.